Patented June 25, 1940

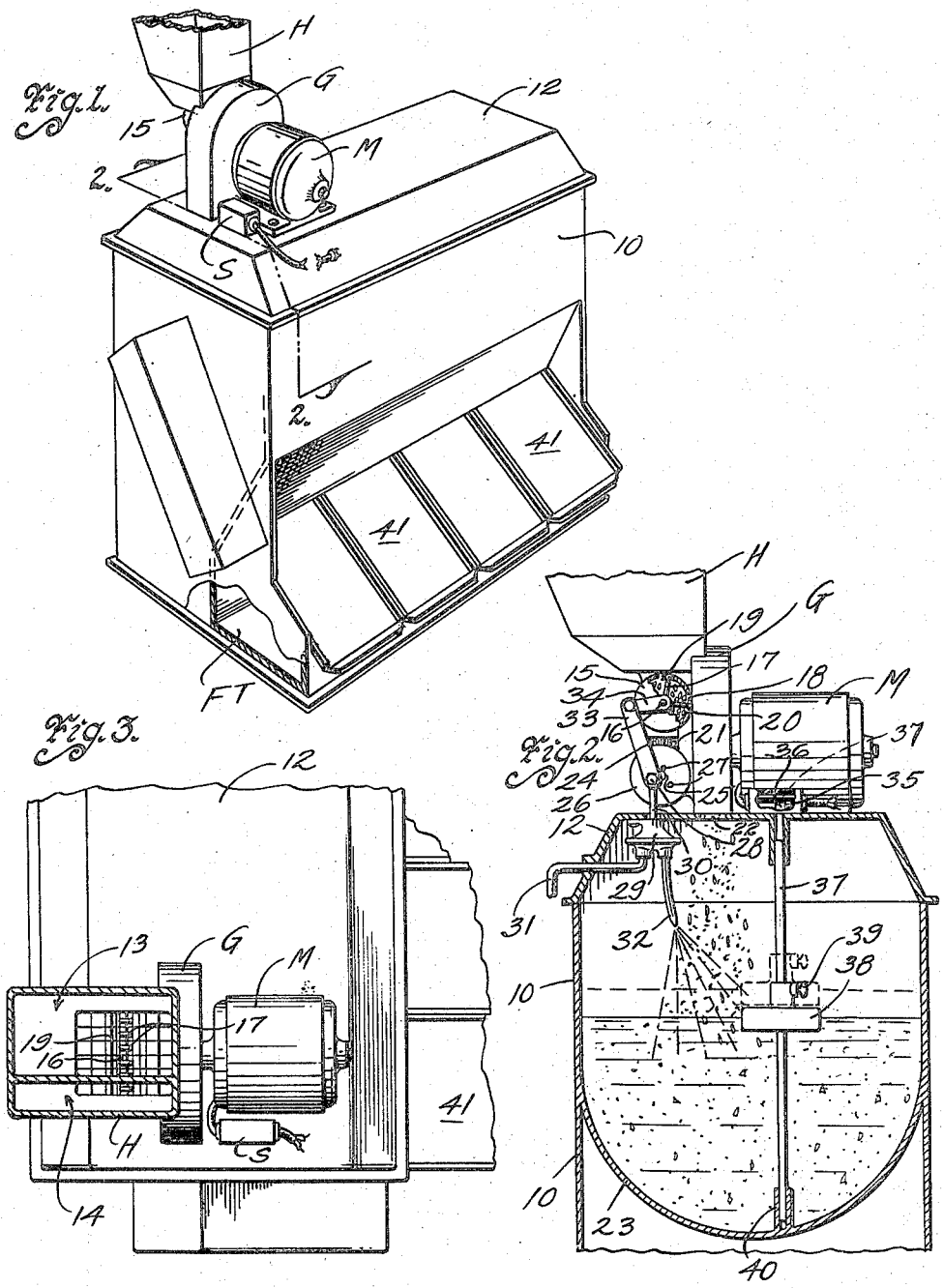

2,205,898

UNITED STATES PATENT OFFICE 2,205,898

FEED GRINDING AND CULTURING APPARATUS

Fred K. Chandler, Des Moines, Iowa

Application April 24, 1939, Serial No. 269,688

5 Claims. (Cl. 99—235)

An object of my invention is to provide feed grinding and culturing apparatus of simple, durable and inexpensive construction which may be used in connection with the apparatus shown in my copending application, Serial No. 222,454.

Another object is to provide apparatus which includes a grinder and a hopper for supplying unground feed and culturing agent to the grinder in such manner that the feed after it is ground and the culturing agent are discharged from the grinder into a receptacle therefor, a motor being provided to drive the grinder and a pump being driven by the motor for the purpose of spraying water into the receptacle, thus producing a mixture of water, ground feed and culturing agent therein.

Another object is to provide control means for the motor which is responsive to the level of the mixture in the receptacle, thus automatically controlling the operation of the grinder and the supply of feed and culturing agent to the receptacle and the supply of water to the receptacle.

A further object is to provide a convenient means for adjusting the float for operation at different levels of the mixture in the receptacle so that my apparatus may be adapted for feeding any desired number of animals, with the mixture of water, ground feed and culturing agent in the receptacle remaining therein the desired length of time for proper culturing without leaving it long enough to sour or develop wild bacteria.

With the foregoing and other contemplated as well as obvious objects in view, the invention comprises the combination of elements and arrangement of parts so combined as to coact and cooperate with each other in the performance of the functions and the accomplishment of the results herein contemplated and comprises in one of its adaptations the species or preferred form illustrated in the accompanying drawing, wherein—

Figure 1 is a perspective view of a feed grinding and culturing apparatus embodying my present invention, a portion thereof being shown in section;

Figure 2 is a sectional view thereof on the line 2—2 of Figure 1, and

Figure 3 is a plan view of a portion of my apparatus.

On the accompanying drawing I have used the reference numeral 10 to indicate generally a casing and 12 a cover therefor. Mounted on the cover 12 is a grinder G, a motor M, a switch S and a hopper H. The hopper H has an unground feed compartment 13 and a culturing agent compartment 14. The compartments 13 and 14 open into an agitator housing 15.

An agitator shaft 16 is provided in the housing 15 and within the housing, agitator fingers 17 and 18 are mounted thereon. These fingers are located adjacent inlet and outlet openings 19 and 20, respectively, of the housing 15 (see Figure 2).

The grinder G may be of any suitable character, preferably of the hammer mill type. As these mills are of conventional character, I have made no attempt to illustrate the construction specifically in the drawing but suffice it to say that the rotor of the mill is directly mounted on the shaft 21 of the motor M.

The grinder G discharges ground grain and culturing agent into a receptacle 23 through an opening 22 in the cover 12. The motor shaft 21 also extends into a gear housing 24 provided for gearing, such as one of conventional worm and worm gear type. A pump operating shaft 25 is driven by the gearing and in turn drives a crank disc 26.

The crank disc 26 is provided with three threaded openings 27 adapted to selectively receive a cap screw 28 which serves as a crank pin. The three openings 27 are at different distances from the axis of rotation of the disc 26 to provide for different degrees of throw for the crank pin 28. A diaphragm pump 29 is provided with an actuating stem 30 extending from the diaphragm thereof. This stem is journaled on the crank pin 28, so that the pump is thereby operated whenever the motor M is energized.

The pump 29 has an intake 31 from any suitable source of water supply, and an outlet pipe 32 in the form of a nozzle adapted to spray water into the receptacle 23 when the pump is being operated.

A link 33 operatively connects the crank pin 28 with an arm 34 that is mounted on the agitator shaft 16. The link 33 and the arm 34 serve as a means to operate the agitator fingers 18 and 19.

The switch S includes contacts 35, one of which is mounted on a leaf spring 36, so that the contacts may be separated upon rise of a float rod 37 to a predetermined position. A float 38 is provided on the rod 37 and may be fixed at any desired point by a set screw 39. The lower end of the float rod 37 is guided in a sleeve 40.

Practical operation

In the operation of my apparatus, the hopper H is filled in its compartment 13 with suitable feed to be ground and in its compartment 14 with culturing agent, such as one containing yeast or the like. The weight of the float 38 normally permits the switch contacts 35 to remain closed and therefore the motor M is energized. This will cause the grinder G to operate and the feed to be ground, which, with the culturing agent, will be supplied to the grinder as long as the motor operates due to the operation of the agitating fingers 17 and 18. The ground feed and culturing agent will be discharged through the opening 22 into the receptacle 23, and the pump 29 as it operates will spray water into the receptacle, as illustrated in Figure 2.

As the level of the mixture consisting of the water, ground feed and culturing agent rises, for instance, from the solid line position to the dotted line position of Figure 2, the motor will continue to operate and the agitator, grinder and pump likewise will continue to operate. When the dotted position is reached, the switch S is opened so that the motor M is de-energized and thereafter the level of the mixture in the receptacle 23 will be automatically maintained, as long as there is a supply of unground feed and culturing agent in the hopper H.

The relative sizes of the portions of the opening 19 in the bottom of the hopper H, which portions communicate with the compartments 13 and 14, regulate the proportions of feed to culturing agent, and the water supplied by the pump 29 is also in proportion to the feed and culturing agent, as the capacity of the pump is made of the proper degree in proportion to the supply from the hopper H. The cap screw 28 may be placed in various of the openings 27 to increase or diminish the supply from the hopper and the supply of water together, yet still maintain their relative proportions.

The mixture in the receptacle 23 is supplied to a feeding trough FT in response to the opening of any one of the doors 41 thereof in any suitable manner. One type of apparatus for this purpose is shown in my copending application hereinbefore referred to.

The float 38 is made adjustable on the float rod 37 because sometimes it is desirable for the apparatus to be used for feeding only a few hogs or other animals, while at other times it is desirable to feed a maximum number within the capacity of the apparatus. However, the length of time the mixture remains in the receptacle 23 must be maintained within certain limits, as it is desirable to have it therein long enough for proper culturing of the feed, yet not so long that the feed sours or develops wild bacteria. The culturing agent of course develops some bacteria which is conducive to the production of a superior quality feed when compared with a feed that consists of ground grain without the culturing agent. Therefore, as a small number of animals can use the feed only slowly, its level in the receptacle 23 must be maintained lower than when a considerable number of animals are feeding from the apparatus.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a feeding apparatus of the character disclosed, a hopper, a grinder adapted to receive unground feed therefrom in predetermined proportions, a motor for driving said grinder, a receptacle adapted to receive ground feed from said grinder, a pump for supplying water to said receptacle, said pump being operatively connected with said motor, a control device for said motor comprising a switch, a float rod for operating said switch, a float responsive to the level of the mixture of ground feed and water in said receptacle, said float being positionable at different elevations on said float rod to cause operation of said motor at different desired levels of said mixture in said receptacle.

2. In a feeding apparatus, a hopper, a grinder adapted to receive unground feed and culturing agent therefrom, a motor for driving said grinder, a receptacle adapted to receive ground feed and culturing agent from said grinder, a pump for supplying water to said receptacle and an agitator adapted to agitate feed and culturing agent from said hopper and thereby effect feeding thereof to said grinder, said pump and said agitator being simultaneously operable with said grinder.

3. In a feeding apparatus of the character disclosed, a grinder adapted to receive unground feed and culturing agent in predetermined proportions, a motor for driving said grinder, a receptacle adapted to receive ground feed and culturing agent from said grinder, means for supplying water to said receptacle for mixing with the ground feed and culturing agent from said grinder, said last means being operable by said motor, and control means for said motor responsive to the level of the mixture of ground feed, culturing agent and water in said receptacle.

4. In an apparatus of the character disclosed, a grinder adapted to receive unground feed, a motor for driving said grinder, a receptacle adapted to receive ground feed from said grinder, means for supplying water to said receptacle for mixing with the ground feed therein, said last means being operable by said motor, control means for said motor and a float responsive to the level of the mixture of ground feed, culturing agent and water in said receptacle and operatively connected with said control means.

5. In a feed grinding and culturing apparatus of the character disclosed, a grinder adapted to receive unground feed and culturing agent in predetermined proportions, a receptacle adapted to receive ground feed and culturing agent from said grinder, a pump for supplying water to said receptacle for mixing with the ground feed and culturing agent from said grinder, and a motor connected with said grinder and said pump to operate them simultaneously only and thereby supply ground feed and culturing agent to said receptacle in relative proportion to the water pumped thereto.

FRED K. CHANDLER.